United States Patent
Friedl et al.

(10) Patent No.: US 9,762,643 B2
(45) Date of Patent: Sep. 12, 2017

(54) PROVIDING HOSTED VIRTUAL DESKTOP INFRASTRUCTURE SERVICES

(71) Applicant: Cisco Technology, Inc., San Jose, CA (US)

(72) Inventors: Stephan Friedl, Frederick, CO (US); Thomas Wesselman, Issaquah, WA (US); Steven Chervets, Longmont, CO (US)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 14/503,778

(22) Filed: Oct. 1, 2014

(65) Prior Publication Data

US 2015/0019751 A1 Jan. 15, 2015

Related U.S. Application Data (63) Continuation of application No. 13/040,740, filed on Mar. 4, 2011, now Pat. No. 8,893,027.

(51) Int. Cl.
*G06F 3/0481* (2013.01)
*H04L 29/06* (2006.01)
*G06F 9/44* (2006.01)

(52) U.S. Cl.
CPC ........ *H04L 65/608* (2013.01); *G06F 9/4445* (2013.01); *H04L 65/1026* (2013.01); *H04L 65/1069* (2013.01)

(58) Field of Classification Search
CPC .................................................. G06F 3/0481
USPC .......................................................... 715/760
See application file for complete search history.

(56) References Cited

U.S. PATENT DOCUMENTS

| | | | | |
|---|---|---|---|---|
| 6,463,459 B1* | 10/2002 | Orr | ........ | G06F 9/4445 709/202 |
| 6,941,382 B1* | 9/2005 | Tuli | ........ | G06F 17/30905 707/E17.121 |
| 7,117,243 B2* | 10/2006 | Peart | ........ | G06F 9/547 345/1.1 |
| 7,260,564 B1* | 8/2007 | Lynn | ........ | G06F 17/30876 |
| 7,330,872 B2* | 2/2008 | Peart | ........ | G06F 9/547 709/203 |
| 7,577,559 B2* | 8/2009 | Lesser | ........ | H04L 67/2823 703/23 |
| 7,730,157 B2* | 6/2010 | Baratto | ........ | G06F 3/14 709/217 |
| 7,779,091 B2* | 8/2010 | Wilkinson | ........ | G06F 9/505 707/999.01 |
| 2003/0069924 A1* | 4/2003 | Peart | ........ | G06F 9/547 709/203 |
| 2003/0222917 A1* | 12/2003 | Trantow | ........ | G06F 1/1626 715/778 |
| 2004/0073941 A1* | 4/2004 | Ludvig | ........ | H04N 21/2355 725/113 |

(Continued)

*Primary Examiner* — Reza Nabi
(74) *Attorney, Agent, or Firm* — Patterson + Sheridan LLP (57) ABSTRACT

In an example embodiment, a device provides a connection to an endpoint coupled with a first network to a virtual desktop client coupled with a second network. The device obtains data from the virtual desktop client which client which includes at least one link to data available from an external server, such as streaming media. The device obtains the data from the external server and provides the data with data obtained from the virtual desktop client to the endpoint.

22 Claims, 5 Drawing Sheets

(56) References Cited

U.S. PATENT DOCUMENTS

| | | | | |
|---|---|---|---|---|
| 2004/0216084 A1* | 10/2004 | Brown | G06Q 10/0633 | 717/102 |
| 2004/0216161 A1* | 10/2004 | Barone, Jr. | H04H 20/14 | 725/46 |
| 2008/0092083 A1* | 4/2008 | Dutton | G06F 3/04815 | 715/848 |
| 2009/0271513 A1* | 10/2009 | Liu | H04L 45/00 | 709/224 |
| 2009/0320073 A1* | 12/2009 | Reisman | G06F 17/30873 | 725/51 |
| 2010/0088397 A1* | 4/2010 | Jaudon | G06F 9/4856 | 709/220 |
| 2010/0235411 A1* | 9/2010 | Bray | G06F 17/3089 | 707/812 |
| 2010/0279766 A1* | 11/2010 | Pliska | H04N 7/163 | 463/29 |
| 2010/0299667 A1* | 11/2010 | Ahmad | G06F 12/1018 | 718/1 |
| 2011/0004680 A1* | 1/2011 | Ryman | G06F 9/4445 | 709/224 |
| 2011/0055716 A1* | 3/2011 | Kim | H04L 12/2814 | 715/740 |
| 2011/0060999 A1* | 3/2011 | So | G06F 9/4445 | 715/740 |
| 2011/0072086 A1* | 3/2011 | Newsome | G06F 17/30905 | 709/204 |
| 2011/0072106 A1* | 3/2011 | Hoffert | G06F 17/30905 | 709/217 |
| 2011/0072107 A1* | 3/2011 | Gutta | G06F 17/30905 | 709/217 |
| 2011/0072114 A1* | 3/2011 | Hoffert | G06F 17/30905 | 709/219 |
| 2011/0113472 A1* | 5/2011 | Fung | H04L 63/0227 | 726/3 |
| 2011/0184993 A1* | 7/2011 | Chawla | G06F 9/45533 | 707/802 |
| 2011/0197126 A1* | 8/2011 | Arastafar | G06F 17/30905 | 715/243 |
| 2011/0304631 A1* | 12/2011 | Graffagnino | G06F 17/2205 | 345/473 |
| 2012/0059883 A1* | 3/2012 | Yohai-Giochais | G06F 17/3089 | 709/206 |
| 2012/0109945 A1* | 5/2012 | Lapko | G06F 17/30905 | 707/723 |
| 2012/0137210 A1* | 5/2012 | Dillon | G06F 17/30902 | 715/234 |
| 2012/0144343 A1* | 6/2012 | Tseng | G06F 3/0482 | 715/834 |
| 2012/0210349 A1* | 8/2012 | Campana | G06F 3/147 | 725/32 |
| 2012/0226992 A1* | 9/2012 | Clift | H04L 67/025 | 715/740 |
| 2012/0233549 A1* | 9/2012 | Ricci | H04M 1/72519 | 715/740 |

\* cited by examiner

FIG. 10

PROVIDING HOSTED VIRTUAL DESKTOP INFRASTRUCTURE SERVICES

TECHNICAL FIELD

The present disclosure relates generally to providing Hosted Virtual Desktop (HVD) services.

BACKGROUND

"Virtual desktop" is a term used within the WIMP (window, icon, menu, and pointing) paradigm for providing a user with an interface that mimics the interface of another device such as the user's desktop computer. Typically, the same interface is always provided. Some devices, such as mobile devices, however, have limited capabilities.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a first interface configured to communicate with an endpoint, a second interface configured to communicate with an external source, and enterprise component browser logic coupled with the first interface and second interface. The enterprise component browser logic receives data for the endpoint from the external source via the second interface. The data for the endpoint comprises data representative of a first data type and data representative of at least one other data type. The enterprise component browser logic generates a semi-processed page for the endpoint based on the data. The enterprise component browser logic inserts the data representative of the first data type into the semi-processed page. The enterprise component browser logic processes the data representative of the at least one other data type and inserts the results of processing the data representative of the at least one other data type into the semi-processed page. The enterprise component browser logic sends the semi-processed page with the data representative of a first data type and the results of processing the data representative of at least one other data type to the endpoint via the first interface.

In accordance with an example embodiment, there is disclosed herein an apparatus comprising a first interface configured to communicate with a virtual desktop client, a second interface configured to receive data for the virtual desktop client from a source, and proxy connection logic coupled with the first interface and the second interface. The data comprises a link to media data and a link to non-media data. The proxy connection logic forwards the data to the virtual desktop client via the first interface. The proxy connection logic receives a request for the media data from an endpoint via the first interface. The proxy connection logic acts as a proxy for the endpoint and forwards the request to the source for the media for the endpoint.

In accordance with an example embodiment, there is disclosed herein an apparatus comprising a first interface for communicating with an endpoint, a second interface for communicating with devices disposed on an enterprise network, and service provider gateway logic coupled with the first interface and second interface. The service provider gateway logic provides virtual desktop data from a hosted virtual desktop disposed on the enterprise network to the endpoint and also provides a predefined data type for the endpoint from a server to the endpoint, bypassing the hosted virtual desktop.

In accordance with an example embodiment, there is disclosed herein a method comprising associating with an endpoint coupled with a first interface and selecting a virtual desktop client coupled with a second interface for the endpoint. Data for the endpoint is received from the virtual desktop client. The data comprises at least one link to data available from an external server. The data available from the external server is obtained from the external server responsive to receiving the link. The data from the virtual desktop client and the data from the external server are provided to the endpoint.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Disclosed in an example embodiment herein is a HTML (Hypertext Markup Language) or any suitable protocol browser for use in a virtual desktop infrastructure (VDI) environment. The browser is split into two separate components, a server (or enterprise) component that executes either in the user's virtualized desktop in a datacenter or as an enterprise service in a datacenter and the second component which executes in the VDI endpoint local to the user.

In an example embodiment, the server component of the browser in the desktop client connects to HTTP servers, executes JavaScript, parses HTML and controls the browser window size and location on the desktop. The server component of the browser does not render images or other media; rather the server component of the browser leaves those tags in place and passes a semi-processed HTML page to the endpoint-side browser component.

The endpoint component would take the partially processed HTML page, process the image and media tags locally and render the media locally. The endpoint establishes connections to the media servers, rather than relying on the desktop in the enterprise component to establish those connections and provide the media to the endpoint. Computationally complex elements, such as HTML5 (Hytper-Text Markup Language version 5) canvas tags with JavaScript, could be encoded to an MP4 or motion JPEG, exposed as a URL and then replaced by a hyperlink in the partially processed HTML sent to the client. This approach can obviate the need for complex script execution on the endpoint.

In an example embodiment, client elements are created for other types of devices such as smartphones, to extend the enterprise browser and enterprise Software as a Service (SaaS) applications to a mobile user. Selection of elements to render on the endpoint can be defined in terms of the well-defined HTML5 tags. For example, an additional browser setting such as "Local Rendering" could be added. This would be a string containing tags to render on the endpoint such as "<video>", "<source>", or "<img>".

Figure 1:
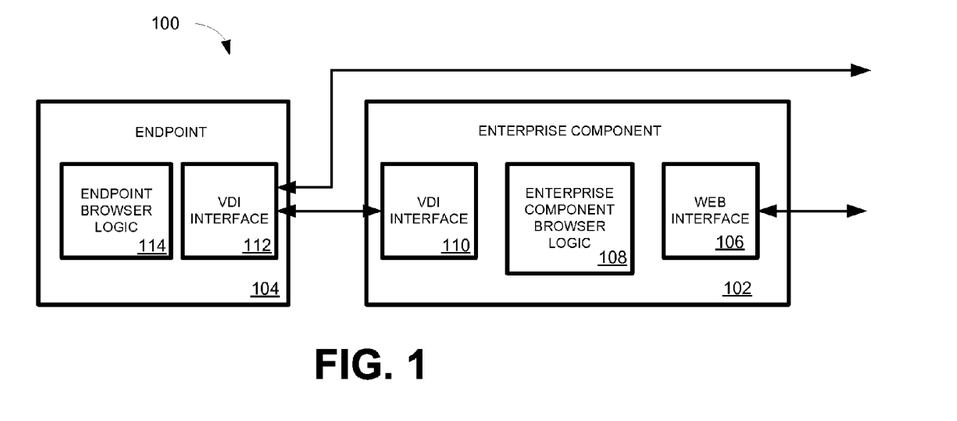
FIG. 1 is a block diagram illustrating an example of a virtual desktop with a browser configured in accordance with an example embodiment.

FIG. 1 is a block diagram illustrating a detailed example of a virtual desktop implementation with a browser 100 configured in accordance with an example embodiment. Browser 100 comprises an enterprise component 102 and an endpoint component 104. Enterprise component 102 is coupled to a network (not shown) and is on a device that generates a virtual desktop for the device where endpoint component 104 resides.

Enterprise component 102 comprises a web interface 106 configured to obtain data from a network such as the world wide web or Internet. Enterprise component browser logic 108 receives data for endpoint component 104 via web interface 106. Enterprise component browser logic 108 generates a semi-processed page for endpoint component 104 that is forwarded to endpoint component 104 via VDI interface 110. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Endpoint component 104 receives the semi-rendered page from enterprise component 102 via VDI interface 112. Endpoint browser logic 114 processes the data received via VDI interface 112 and produces the appropriate output on a user interface (not shown).

In an example embodiment, the data received on web interface 106 comprises data representative of a first data type and data representative of at least one other data type. Enterprise component browser logic 108 generates a semi-processed page for the endpoint based on the data. Enterprise component browser logic 108 inserts the data representative of the first data type into the semi-processed page. Enterprise component browser logic 108 processes the data representative of the at least one other data type and inserts the results of processing the data representative of the at least one other data type into the semi-processed page. Enterprise component browser logic 108 sends the semi-processed page with the data representative of a first data type and the results of processing the data representative of at least one other data type to the endpoint component 104 via first VDI interface 110.

In an example embodiment, the first media type is one of a group consisting of a video stream, an audio stream, an audiovisual stream, a data stream, an image, and any combination of an image, video stream, audio stream, and data stream.

In an example embodiment, the data received via web interface 106 for endpoint component 104 comprises HTML (hyper text markup protocol) data (also referred to as "links" or "tags") or similar type data. Enterprise component browser logic 108 determines whether there are links or tags to media and/or image data. Links or tags to non-media data are processed and rendered on the virtual desktop (semi-processed page) by enterprise component browser logic 108. Links or tags to media and/or image data are encoded into the semi-processed page. The semi-processed page is forwarded via VDI interface 110 to endpoint component 104.

In an example embodiment, enterprise component browser logic 108 determines whether the data for endpoint component 104 comprises a java script. Enterprise component browser logic 108 executes the java script and inserts the results into the semi-processed page. In particular embodiments, enterprise component browser logic 108 may encode the executed java script as Motion Picture Expert Group-4 (MP4) data, and/or a motion (for example a motion JPEG (Joint Photograph Experts Group) image. A Uniform Resource Locator (URL) to the encoded result is inserted into the semi-processed page.

Endpoint browser logic 114 receives the semi-processed page from enterprise component 102. Endpoint browser logic 114 obtains any image, media, and/or streaming data encoded in the semi-processed page from the source specified in the semi-processed page. The image, media, and/or streaming data bypasses enterprise component 102. For example, referring to FIG. 2 with continued reference to FIG. 1, there is illustrated an example 200 where an endpoint component 104 obtains a semi-processed page from an enterprise component 102 bypasses enterprise component 102 to obtain image, media, and/or streaming data. In the illustrated example, endpoint 104 obtains media data from a network component such as a switch and/or router (switch/router) 202.

Figure 2:
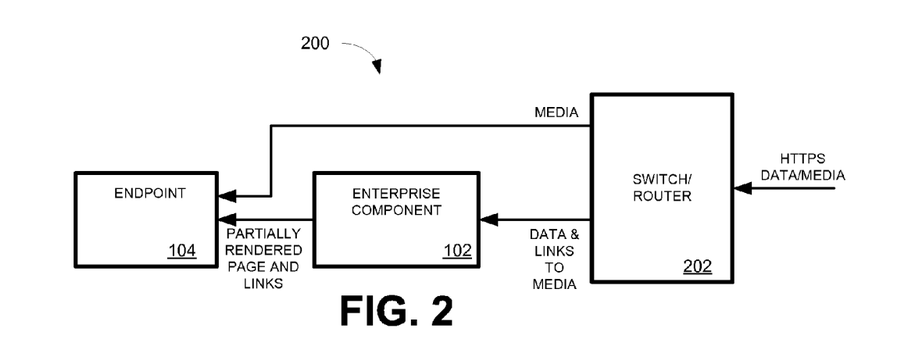
FIG. 2 is a block diagram illustrating an example where an endpoint obtains a semi-processed page from an enterprise component bypasses the enterprise. component to obtain image, media, and/or streaming data.

In an example embodiment, switch/router 202 acts as a proxy for endpoint 104. For example, if enterprise component 102 has established a HTTPS (Hypertext Transfer Protocol Secure) session, the session may be terminated if endpoint component 104 sends a link to the external source (or server) requesting the media. Switch/router 202 acts as a proxy for endpoint component 104 and forwards the request to the source for endpoint component so the session connection remains open.

Figure 3:
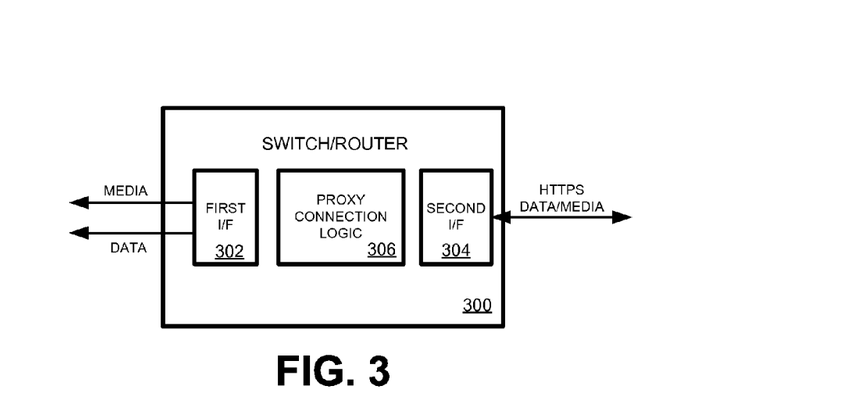
FIG. 3 is a block diagram illustrating an example of switch/router capable of providing a proxy service for providing a media stream directly to an endpoint.

FIG. 3 is a block diagram illustrating an example of switch/router 300 capable of providing a proxy service for providing a media stream directly to an endpoint. For example, switch/router 300 can be employed to implement switch/router 202 (FIG. 2) which provides media to endpoint component 104 (FIG. 2).

Switch/router 300 comprises a first interface 302 configured to communicate with a virtual desktop client, a second interface 304 configured to receive data for the virtual desktop client from a source, and proxy connection logic 306 coupled with first interface 302 and the second interface 304 and operable to perform the functionality described herein.

In an example embodiment, data comprising a link to media data and a link to non-media data is received via second interface 304. Proxy connection logic 306 forwards the data to the virtual desktop client via first interface 302. Proxy connection logic 306 receives a request for the media data from an endpoint via first interface 302. Proxy connection logic 306 acts as a proxy for the request to provide the media to the endpoint.

For example, the data received via second interface 304 for the desktop client may suitably comprise a Hypertext Transfer Protocol Secure (HTTPS) session. Because the session was established with the desktop client (see e.g., enterprise component 102 in FIG. 2), a request for media from the endpoint (see e.g., endpoint component 104 in FIG. 2) would end the session. To prevent this, proxy connection logic 306 forwards the request for media to the source using an address for the virtual desktop interface for the forwarded request. When proxy connection logic 306 receives a response to the request, the response is forwarded to the endpoint.

In an example embodiment, there is disclosed herein a combination of a VDI gateway device (or service provider gateway) that would exist in a service provider's network coupled with a matching VDI portal appliance in an enterprise network's Data Center desktop client. Together these devices would serve to substantially ease the extension of VDI solutions to endpoints connecting from the public internet. The service provider gateway would permit an ISP (Internet Server Provider) to offer a VDI connectivity service to enterprise networks, facilitating deployment of VDI to remote users.

The service provider gateway provides a layer of insulation between the endpoint client and the enterprise virtual desktop. In an example embodiment, the service provider gateway can provide protocol conversion and/or deliver appropriate VDI client images to endpoints to match the endpoint to the enterprise desktop client, which can be beneficial under circumstances in which the enterprise may not have complete control over the endpoint, for example a remote worker connecting to the VDI desktop from a home PC.

In an example embodiment, service provider gateway accepts VDI endpoint connection requests from a public network such as the public internet. The service provider gateway secures the connection with TLS (transport layer security) or other suitable security protocol. The service provider gateway associates the connection request with a specific enterprise subscriber. The service provider gateway authenticates the endpoint and/or user with an authentication device (e.g., server) for the enterprise network. In an example embodiment, the authentication device is disposed on the enterprise subscriber's premises. The service provider gateway establishes a secure connection to a VDI desktop client (DC) on the enterprise network and tunnels the VDI session through this connection. The service provider gateway remains in the control and media paths for the VDI session until that session is terminated.

In an example embodiment, the service provider gateway can also: provision zero-client endpoints with updated firmware or software, provide content pushed from the enterprise network to endpoints without involving enterprise desktop client resources, offload VDI protocol conversion from DC resources to enable the use of a variety of VDI endpoints, convert a VDI protocol to a standard video format for consumption by non-VDI endpoints, mix internet sourced rich media into the VDI session, bypassing DC resources, provide linkage to PSTN (packet switched telephone network) telephony integration for UC (Unified Communications) enabled client endpoints, optimize the routing of the VDI connection from the user location to the nearest enterprise datacenter, optimize the routing of UC audio and video, streaming audio and video, and potentially other media types when the media source and/or destination lies outside the enterprise network. The service provider gateway can avoid hair pinning media from outside the enterprise network to the Hosted desktop virtual machine VDI EP (endpoint) image in the datacenter, and to the user outside the enterprise. The service provider gateway may apply diagnostics, monitoring, and other tools to improve the connection and user experience of the VDI session. The service provider gateway may apply policy both as a connection is established, and over the lifetime of the VDI session. The service provider gateway can federate identity between organizations/enterprises to enable end-users outside the primary organization to access virtualized applications and/or desktops within the organization. Consultants, manufacturing partners, and outsourced staff are a few examples. The service provider gateway can integrate with mobile carriers to provide mobile access to virtualized applications and/or desktops.

Figure 4:
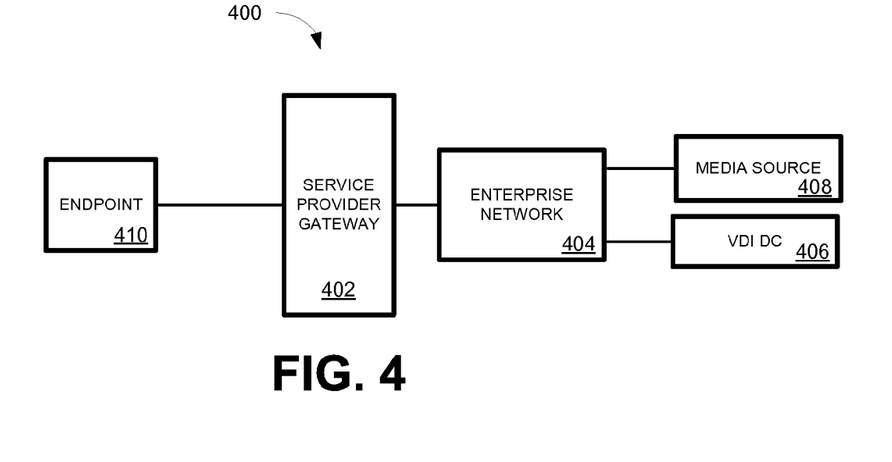
FIG. 4 is a block diagram illustrating an example of a virtual desktop implementation employing a service provider gateway to connect to a virtual desktop client on an enterprise network.

FIG. 4 is a block diagram illustrating an example of a virtual desktop implementation 400 employing a service provider gateway 402 to connect to a virtual desktop client 406 on an enterprise network 404. In the illustrated example, a service provider gateway 402 is coupled to an enterprise network 404 that is coupled to a Hosted Virtual Desktop Virtual Machine in the enterprise Data Center VDI Desktop Client (DC) 406 and media source 408.

In an example embodiment, service provider gateway 402 accepts VDI endpoint connection requests from a public network such as the public internet from endpoint 410. Service provider gateway 402 employs TLS (or any suitable security protocol) to secure the connection with endpoint 410. Service provider gateway 402 associates the connection request with a specific enterprise subscriber, which in this example is VDI DC 406. Service provider gateway 402 authenticates endpoint 410 and/or user data provided by endpoint 410 with an authentication device for the enterprise network (not shown; however those skilled in the art should readily appreciate that any suitable type of authentication device such as a AA "Authorization Authentication and Accounting" server, for example a RADIUS "Remote Authentication Dial-In User Server/Service" server can be employed). The authentication device may be incorporated into the device hosting VDI DC 406 or may be a dedicated authentication server. Service provider gateway 402 establishes a secure connection to VDI DC 406 via enterprise network 404 and tunnels the VDI session through this connection. Service provider gateway 402 remains in the control and media paths for the VDI session until that session is terminated.

In an example embodiment, the service provider gateway 402 can also: provision endpoint 410 with updated firmware or software, provide content pushed from the enterprise network, for example from media source 408, to endpoint 410 without involving enterprise desktop client resources, offload VDI protocol conversion from VDI DC 406 to enable the use of a variety of VDI endpoints, convert a VDI protocol to a standard video format for consumption by endpoint 410 if endpoint 410 is a non-VDI endpoint, mix internet sourced rich media (e.g., from media source 408) into the VDI session, bypassing VDI DC 406 resources, provide linkage to a PSTN (which may be available via Enterprise network 404) and telephony integration for UC enabled client endpoints, optimize the routing of the VDI connection from the user location to the nearest enterprise datacenter (see e.g., FIG. 5), optimize the routing of UC audio and video, streaming audio and video, and potentially other media types when the media source and/or destination lies outside the enterprise network. The service provider gateway can avoid hair pinning media from outside enterprise network 404 to the VDI DC 406, and then to endpoint 410. Service provider gateway 402 may apply diagnostics, monitoring, and other tools to improve the connection and user experience of the VDI session. Service provider gateway 402 may apply policy both as a connection is established, and over the lifetime of the VDI session. Service provider gateway 402 can federate identity between organizations/enterprises to enable endusers associated with endpoint 410 that are outside the primary organization, such as consultants, manufacturing partners, and/or outsourced staff, to access virtualized applications and/or desktops within the organization. In particular embodiments, service provider gateway 402 can integrate with mobile carriers to provide mobile access to virtualized applications and/or desktops to endpoint 410.

Figure 5:
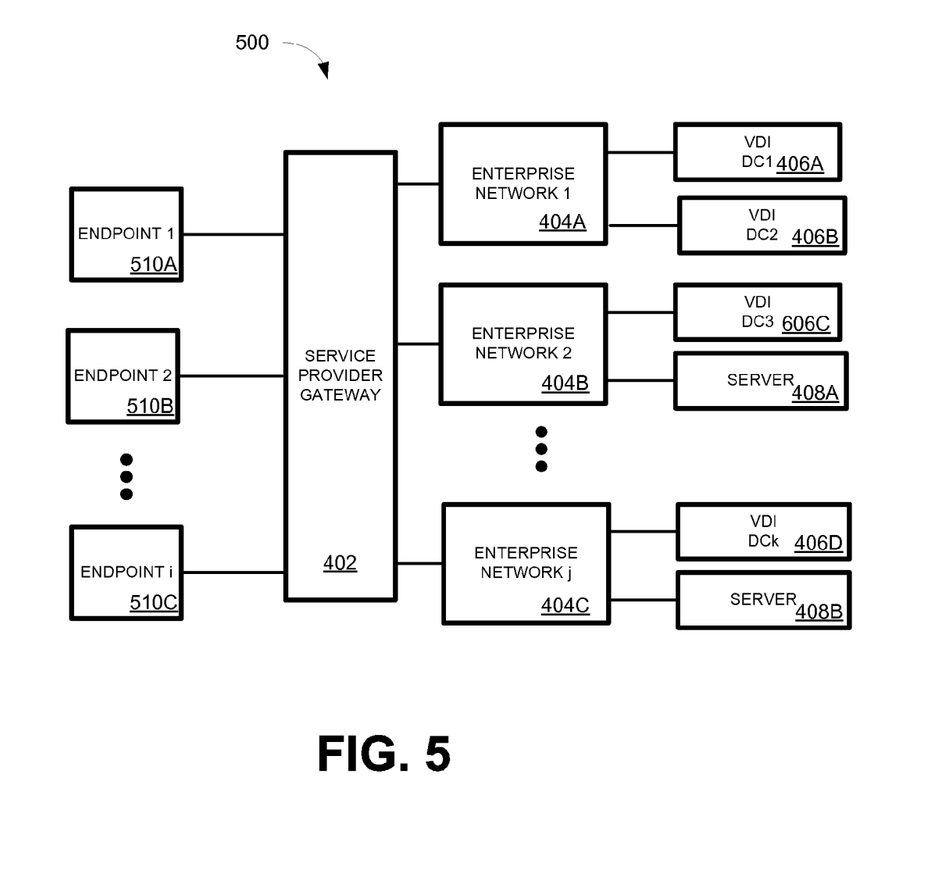
FIG. 5 is a block diagram illustrating an example of a virtual desktop implementation employing a service provider gateway to connect to a virtual desktop where the service provider gateway provides connectivity to a multiplicity of enterprise networks.

FIG. 5 is a block diagram illustrating an example of a virtual desktop implementation 500 employing a service provider gateway to connect to a virtual desktop where the service provider gateway provides connectivity to a multiplicity of enterprise networks. In the illustrated example endpoints 510A, 510B, 510C communicate with service provider gateway 402. Service provider gateway is coupled with enterprise networks 404A, 404B, and 404C. Enterprise network 404A is coupled with VDI desktop clients 406A, 406B. Enterprise network 404B is coupled with VDI desktop client 406C and a source of media/image data (server) 408A. Enterprise network 404C is coupled with VDI desktop client 406D and server a source of media/image data (server) 408B.

In an example embodiment, in response to a VDI endpoint connection request from an endpoint, for example endpoint 510A, service provider gateway 402 determines the appropriate enterprise network selected from networks 404A, 404B, . . . 404C for endpoint 510A. If the enterprise networks 404A, 404B, . . . 404C belong to different organizations, enterprise gateway 402 determines the appropriate enterprise network based on the organization. In an example embodiment, where an organization has multiple enterprise networks, service provider gateway 402 selects the best network for the endpoint. For example, service provider gateway 402 may select the nearest network or may select a network based on load balancing. For example if enterprise networks 404B and 404C belonged to the same organization associated with endpoint 510A, service provider gateway 402 would select one of networks 404B and 404C based on the location of endpoint 51OA, such as the nearest enterprise network.

In an example embodiment, service provider gateway 402 may select the best source of media for an endpoint. For example, if endpoint 410B is associated with network 404A, and media, such as streaming media and/or an image, is to be provided to endpoint 410B, service provider gateway 402 selects one of servers 408A, 408B to provide the media. Service provider gateway 402 may use any criteria for selecting the server such as location, network bandwidth, etc.

In the illustrated example there are i endpoints, j enterprise networks, and k VDI Desktop Clients, where i, j, and k are integers greater than one. The illustrated example shows three endpoints, three enterprise networks and four desktop interfaces; however, those skilled. in the art should readily appreciate that thee number of endpoints, enterprise networks, desktop interfaces, and servers were selected merely for ease of illustrating the example embodiments described herein and that i, j, and k may be any physically realizable number and that I, j, and k mayor may not be equal.

Figure 6:
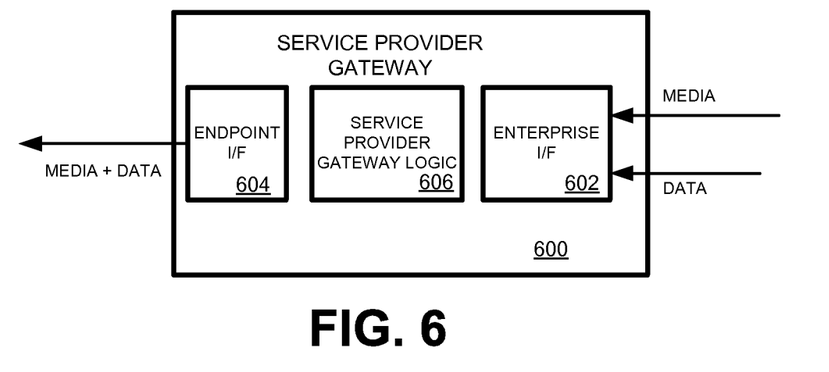
FIG. 6 is a block diagram of a service provider gateway upon which an example embodiment can be implemented.

FIG. 6 is a block diagram of a service provider gateway 600 upon which an example embodiment can be implemented. Service provider gateway 600 is suitable for implementing the functionality of service provider gateway 402 (FIGS. 4 and 5).

Service provider gateway 600 comprises at least one enterprise (first) interface (I/F) 602 that is configured to communicate with at least one enterprise network (not shown, see e.g., FIG. 5). Endpoint (second) interface 604 is employed to communicate with endpoints requesting virtual desktop services. Service provider gateway logic 606 is coupled with enterprise interface 602 and endpoint interface 604.

In an example embodiment, service provider gateway logic 606 receives virtual desktop data from a hosted virtual desktop virtual machine disposed on the enterprise network via enterprise interface 602 and provides the data to the endpoint via interface 604. Service provider gateway logic 606 also provides a predefined data type for the endpoint from a server (received via enterprise interface 602) to the endpoint (via endpoint interface 604), bypassing the hosted virtual desktop virtual machine on the enterprise network. The predefined data type may be selected form a group consisting of video data, audio data, image data, and streaming data, or may be any combination of video data, audio data, image data and streaming data.

In an example embodiment, service provider gateway logic 606 accepts VDI endpoint connection requests from a public network such as the public internet via endpoint interface 604. The service provider gateway logic 606 secures the connection with TLS or any suitable security protocol. The service provider gateway logic 606 associates the connection request with a specific enterprise subscriber. Service provider gateway logic 606 authenticates the endpoint and/or user with an authentication device (e.g., server) for the enterprise network. In an example embodiment, the authentication device is disposed on the enterprise subscriber's premises. Service provider gateway logic 606 establishes a secure connection to a hosted virtual desktop virtual machine on the enterprise network via enterprise interface 602 and tunnels the VDI session through this connection. The service provider gateway remains in the control and media paths for the VDI session until that session is terminated.

In an example embodiment, the service provider gateway can also provision zero-client endpoints with updated firmware or software, provide content pushed from the enterprise network to endpoints without involving enterprise desktop client resources, offload VDI protocol conversion from DC resources to enable the use of a variety of VDI endpoints, convert a VDI protocol to a standard video format for consumption by non-VDI endpoints, mix internet sourced rich media into the VDI session, bypassing DC resources, provide linkage to PSTN telephony integration for UC enabled client endpoints, optimize the routing of the VDI connection from the user location to the nearest enterprise datacenter, optimize the routing of UC audio and video, streaming audio and video, and potentially other media types when the media source and/or destination lies outside the enterprise network. Service provider gateway logic 606 may apply policy both as a connection is established, and over the lifetime of the VDI session. Service provider gateway logic 606 can federate identity between organizations/enterprises to enable end-users outside the primary organization to access virtualized applications and/or desktops within the organization. Consultants, manufacturing partners, and outsourced staff are a few examples. Service provider gateway logic 606 can integrate with mobile carriers to provide mobile access to virtualized applications and/or desktops.

In an example embodiment, service provider gateway logic may convert data received from a virtual desktop client to a format compatible with an endpoint. For example, referring to FIG. 4 with continued reference to FIG. 6 (where in this example service provider gateway 600 is employed to implement service provider gateway), if endpoint 410 is coupled with endpoint interface 604 and is not compatible with VDI DC 406 that is coupled with enterprise interface 602, service provider gateway logic 606 may convert data received from VDI DC 406 to a format compatible with endpoint 410.

In an example embodiment, enterprise interface 602 is coupled to a plurality of virtual desktop devices disposed at a corresponding plurality of locations. Service provider gateway logic 606 selects a selected virtual desktop client from the plurality of devices for providing virtual desktops based on the location of the endpoint and the location of the selected virtual desktop client. For example, the nearest client to the endpoint may be selected.

Figure 7:
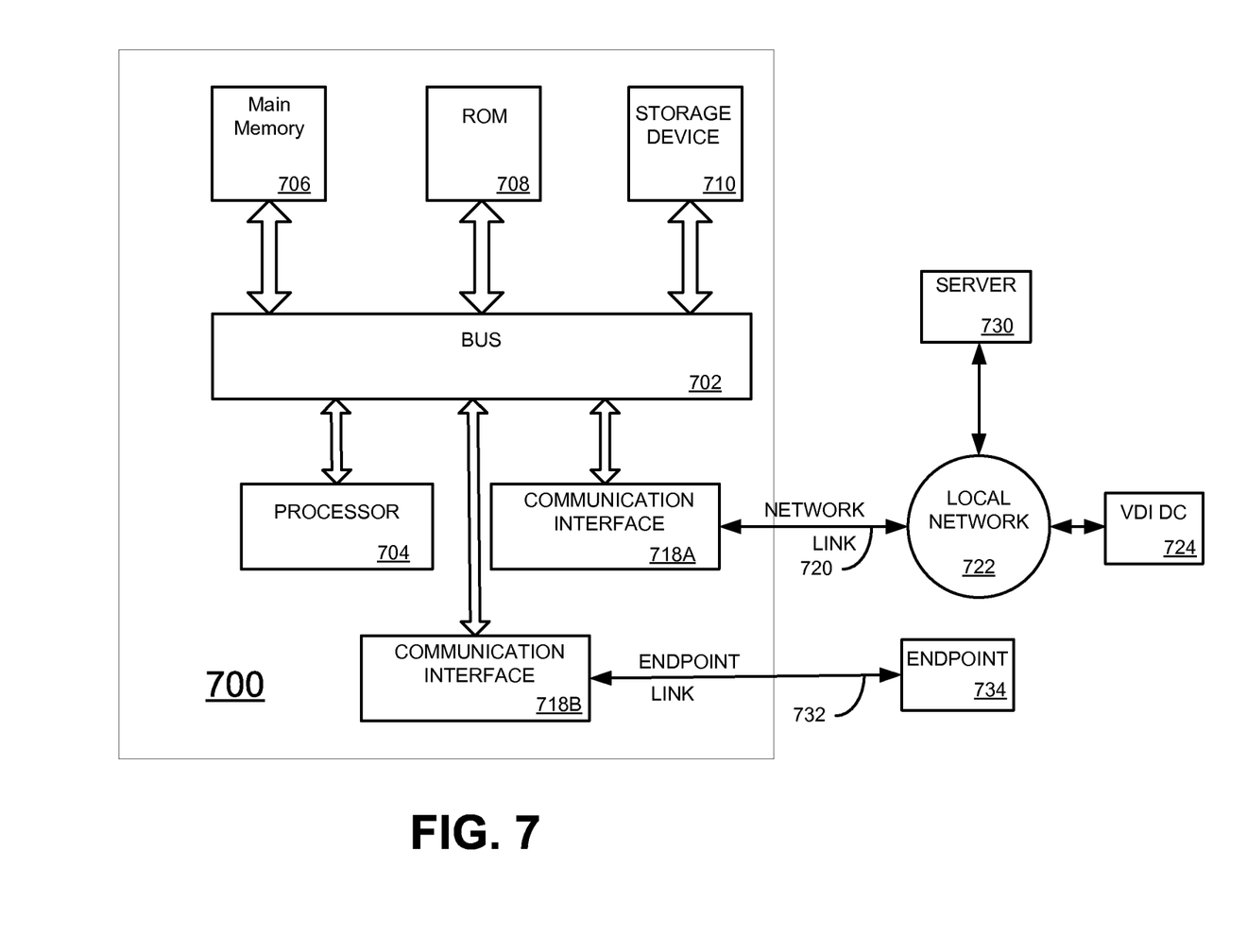
FIG. 7 is a block diagram of a computer system upon which an example embodiment can be implemented.

FIG. 7 is a block diagram of a computer system upon which an example embodiment can be implemented. Computer system 700 includes a bus 702 or other communication mechanism for communicating information and a processor 704 coupled with bus 702 for processing information. Computer system 700 also includes a main memory 706, such as random access memory (RAM) or other dynamic storage device coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

An aspect of the example embodiment is related to the use of computer system 700 for providing hosted virtual desktop infrastructure services. According to an example embodiment, implementing a virtual desktop is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement an example embodiment. Thus, embodiments described herein are not limited to any specific combination of hardware circuitry and software. Computer system 700 may be employed for implementing endpoint 104 (FIG. 1); enterprise component 102 (FIG. 1); switch/router 202 (FIG. 2) Switch/Router 300 (FIG. 3; in an example embodiment processor 704 executes instructions to perform the functionality of proxy connection logic 306) service provider gateway 402 (FIGS. 4 and 5); and/or service provider gateway 600 (FIG. 6; in an example embodiment processor 704 executes instructions to perform the functionality of service provider gateway logic 606).

The term "computer-readable medium" as used herein refers to any medium that participates in providing instructions to processor 704 for execution. Such a medium may take many forms, including but not limited to non-volatile media, and volatile media. Non-volatile media include for example optical or magnetic disks, such as storage device 710. Volatile media include dynamic memory such as main memory 706. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 700 also includes a communication interfaces 718A, 718B coupled to bus 702. Communication interface 718A provides a two-way data communication coupling computer system 700 to a network link 720 that is connected to a local network 722. Communication interface 718B provides two way communication with endpoint 734.

For example, communication interface 718A may be a local area network (LAN) card to provide a data communication connection to a compatible LAN. As another example, communication interface 718A may be an integrated services digital network (ISDN) card or a modem to provide a data communication connection to a corresponding type of telephone line. Wireless links may also be implemented. In any such implementation, communication interface 718A sends and receives electrical, electromagnetic, or optical signals that carry digital data streams representing various types of information.

Network link 720 typically provides data communication through one or more networks to other data devices. For example, network link 720 may provide a connection through local network 722 to a virtual desktop implementation desktop client (VDI DC) 724. In addition, local network 722 may be coupled with a server 730 that is sourcing image and/or media data, enabling media and/or image data to be obtained by computer system 700 while bypassing HVD DC 724.

Communication interface 718B is coupled to endpoint link 732. Endpoint link 732 provides data communication with an endpoint device 734. This allows computer system to receive virtual desktop endpoint requests and to provide virtual desktop data from HVD DC 724 and server 730 to endpoint 734. Although the illustrated example shows two communication interface 718A, 718B those skilled in the art should readily appreciate that this is for ease of illustration and that any physically realizable number of interfaces may be coupled to bus 702.

Figure 8:
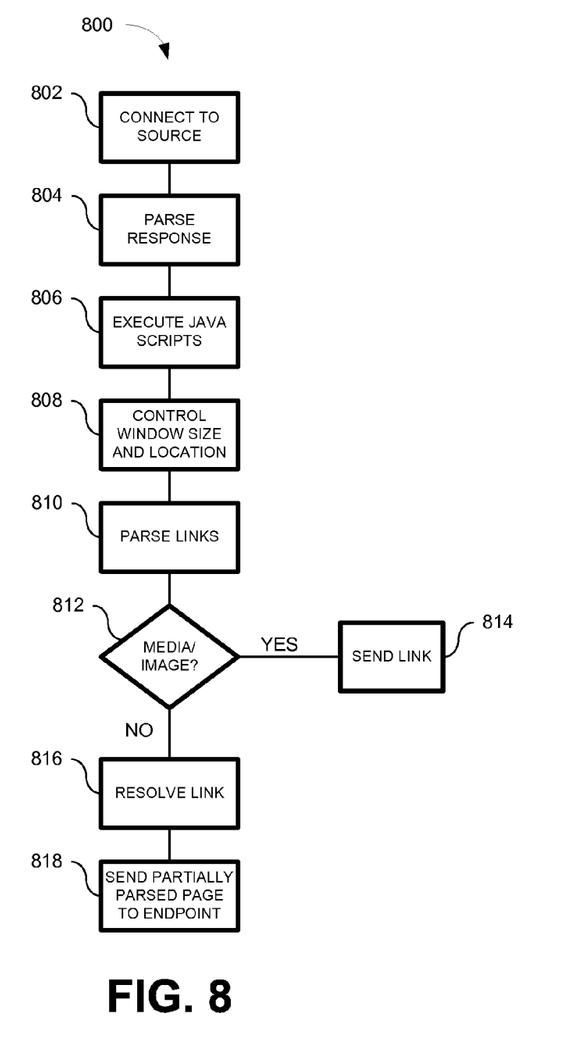
FIG. 8 is a block diagram illustrating an example methodology for implementing a browser for a virtual desktop.
Figure 9:
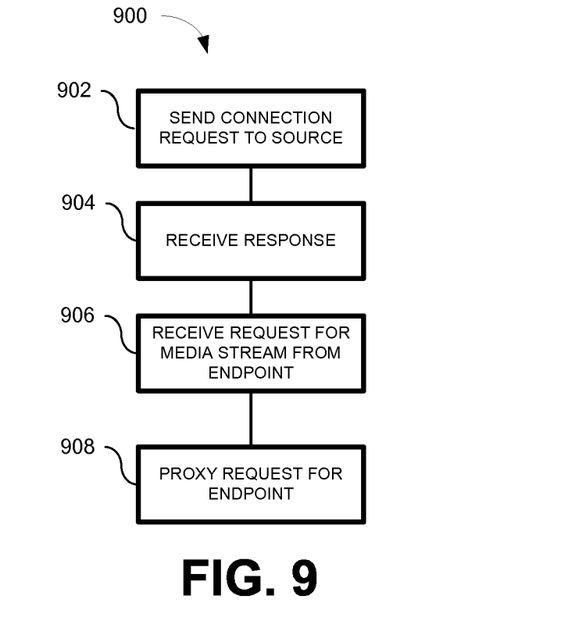
FIG. 9 is a block diagram illustrating an example methodology for providing a proxy service for an endpoint by a switch/router.
Figure 10:
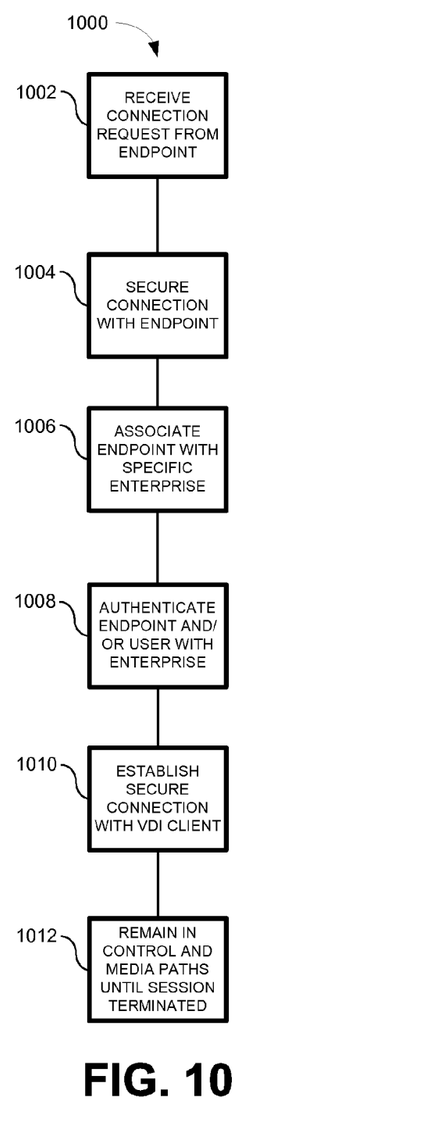
FIG. 10 is a block diagram illustrating an example methodology for a service provider gateway.

In view of the foregoing structural and functional features described above, methodologies in accordance with example embodiments will be better appreciated with reference to FIGS. 8-10. While, for purposes of simplicity of explanation, the methodologies of FIGS. 8-10 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required. The methodologies described herein are suitably adapted to be implemented in hardware, software, or a combination thereof.

FIG. 8 is a block diagram illustrating an example methodology 800 for implementing a browser for a virtual desktop. Methodology 800 may be implemented by enterprise component browser logic 108 (FIG. 1) and/or processor 704 (FIG. 7).

At 802, a connection is initiated with a source such as a server. The connection may be initiated in response to an input received via a user interface on the endpoint device. For example, a user may type in a web address or select a URL.

At 804, the response is parsed. The response may include HTTP data such as links or tags and data such as textual data and formatting data. As the response is parsed, an output such as a web page may be generated.

At 806, java scripts in the response are executed. The results are included in the web page.

At 808, the window size and location of the window on the user interface are determined. This controls the display rendered by the endpoint.

At 810, link (or tags) in the response are parsed. At 812, a determination is made for each link/tag whether the link contains media (such as streaming audio, video, etc.), an image or a large file, for example a file which may take more than a predetermined amount of time, e.g., 30 seconds, to download. If the link/tag is for media or an image (YES), at 814 the link is inserted into the page that will be sent to the endpoint.

If, however, at 812, the determination is made that the link does not point to media or an image (NO), at 816 the link is resolved. For example Data from the URL is downloaded, processed, and inserted at the appropriate place into the page.

At 818, after all of the links/tags have been resolved, a partially parsed page is sent to the endpoint. By partially parsed it meant that links/tags to media content are stored in the page, unresolved, and links/tags to other content are resolved. Thus, the endpoint can obtain the media while bypassing the enterprise browser component.

FIG. 9 is a block diagram illustrating an example methodology 900 for providing a proxy service for an endpoint by a switch/router. Methodology 900 may be implemented by proxy connection logic 306 (FIG. 3), service provider gateway 402 (FIG. 4 and/or 5), and/or processor 704 (FIG. 7).

At 902, a request for a connection is sent to a source. The source, for example, may be a server referenced by a URL.

At 904 a response to the request is received. The response may suitably comprise a partially parsed page that may include formatted data (such as formatted text) and unresolved tags/links.

At 906, a request is received for a data associated with a link such as a media stream, image or other large file that was included in the response. Because some protocols, such as HTTPS will break a connection if the request is received from the endpoint as opposed to the device (e.g. a virtual desktop client or enterprise browser component) that originally initiated the connection, at 908 the request is proxied for the endpoint. For example, the final destination address of the request may be changed to the device that initiated the connection. Upon receipt of the data from the server (e.g., streaming data such as a media stream or image data), the data is routed to the endpoint. Thus, from the viewpoint of the server, the requestor of the media/image is the same as the initiator of the session.

FIG. 10 is a block diagram illustrating an example methodology 1000 for a service provider gateway. Methodology 1000 may be implemented by service provider gateway 402 (FIG. 4 and/or 5), service provider gateway logic 606 (FIG. 6) and/or processor 704 (FIG. 7).

At 1002, a request to connect to a virtual desktop is received from an endpoint. In response to 'the request, at 1004, the connection to the endpoint is secured. For example, a secure tunnel may be established with the endpoint.

At 1006, the endpoint is associated with a specific enterprise. For example, if a service provider gateway is serving multiple enterprises, a determination is made which enterprise is the appropriate enterprise. The determination may be based on whether the endpoint is a member of the enterprise, and/or in the case of the endpoint being associated with multiple enterprises, which enterprise is best suited for the endpoint. For example, the nearest enterprise to the endpoint may be selected, and/or an enterprise having sufficient capacity (e.g. processing capacity and/or bandwidth) to service the endpoint may be selected.

At 1008, the endpoint and/or a user associated with the endpoint is authenticated with the enterprise. Any suitable authentication protocol may be employed.

At 1010, assuming that the endpoint was successfully authenticated, a secure connection is established with a virtual desktop infrastructure (VDI) client. The connection with the VDI client may be secured by the same or different means as employed to secure the connection between the gateway and endpoint.

At 1012, the service provider gateway remains in the control and media paths of the endpoint until the session is terminated. The control and media paths may both be associated with the enterprise, such as for example with a virtual private network (VPN) connection or they may be on separate paths. For example, the control path may be associated with the enterprise network, for example with a VDI client, while the media path may be disposed on another network, such as the public Internet. This allows a desktop to receive virtual desktop data from the VDI desktop client on the enterprise while the media associated with a virtualized desktop may be obtained independent (bypass) of the VDI client, saving bandwidth on the enterprise network.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method, comprising:
   associating with an endpoint with a first interface;
   selecting an external source from which to receive data for the endpoint, wherein the data comprises streaming data available from a plurality of external sources, wherein the selection of the external source from the plurality thereof is based on a distance between the external source selected and the endpoint and a download time for acquiring data from the external source;
   receiving, via a second interface, data for the endpoint from the external source, wherein the data comprises data representative of a first data type and data representative of at least one other data type;
   generating a semi-process page for the endpoint based on the data by execution of executable instructions in the at least one other data type;
   inserting the data representative of the first data type into the semi-processed page;
   processing the executable instructions of the data representative of the at least one other data type to generate content defined by the instructions and inserting the results of the processing of the data representative of the at least one other data type, including generated content into the semi-processed page; and
   sending the semi-processed page with the data representative of the first data type and the results of processing the data representative of the at least one other data type to the endpoint via the first interface.

2. The method set forth in claim 1, wherein the first data type is one of a group consisting of a video stream, an audio stream, an audiovisual stream, a data stream, an image, and any combination of an image, video stream, audio stream, and data stream.

3. The method set forth in claim 1, further comprising:
   determining whether the data representative of the at least one other data type comprises a java script; and
   responsive to a determination that the at least one other data type comprises a java script, executing the java script and inserting the results into the semi-processed page.

4. The method set forth in claim 1, further comprising:
   determining whether the data representative of at least one other data type comprises a java script; and
   responsive to a determination that the at least one other data type comprises a java script, executing the java script, encoding the executed java script as one of a group consisting of a Motion Picture Expert Group-4 data, and a motion image, and inserting a Uniform Resource Locator to the encoded result into the semi-processed page.

5. The method set forth in claim 1, further comprising:
   determining an amount of time to download data associated with a link; and
   responsive to determining the amount of time to download the data associated with the link is greater than a predetermined amount of time, inserting the link into the semi-processed page.

6. The method set forth in claim 1, further comprising:
   determining an amount of time to download data associated with a link; and
   responsive to determining the amount of time to download the data associated with the link is less than a predetermined amount of time, downloading the data associated with the link and inserting the downloaded data into the semi-processed page.

7. A method, comprising:
   associating with an endpoint coupled with a first interface;
   selecting a virtual desktop client coupled to a second interface from which to receive data for the endpoint;
   receiving data for the endpoint at the virtual desktop client, wherein the data comprises at least one link to data available from a plurality of external servers;
   obtaining the data associated with the at least one link from an external server selected from the plurality of external servers, wherein the selection of the external server from the plurality thereof is based on a distance between the external server selected and the endpoint and a download time for acquiring data from the external server;
   processing at least a portion of executable instructions within the data via the virtual desktop client to generate content defined by the executable instructions; and
   sending the data and processed instruction content from the virtual desktop client and data from the external server to the endpoint.

8. The method of claim 7, wherein the data comprises data representative of a first data type and data representative of at least one other data type.

9. The method of claim 8, wherein the first data type of is one of a group consisting of a video stream, an audio stream, an audiovisual stream, a data stream, an image, and any combination of an image, video stream, audio stream, and data stream.

10. The method of claim 8, wherein processing at least a portion of executable instructions within the data via the virtual desktop client to generate content defined by the executable instructions comprises processing executable instructions within the data representative of the at least one other data type.

11. The method of claim 7, further comprising converting data received from the external server to a format compatible with the endpoint.

12. The method of claim 7, wherein sending the data and processed instruction content from the virtual desktop client and data from the external server to the endpoint further comprises mixing the data from the virtual desktop client with the data from the external server.

13. The method of claim 7, wherein obtaining the data from the external server further comprises sending a proxy request to the external server to have data associated with the link delivered to the endpoint, bypassing the virtual desktop client.

14. The method of claim 7, further comprising:
   determining an amount of time for acquiring data associated with the link from the external server; and
   responsive to determining that the time for acquiring the data associated with the link is greater than a predetermined amount of time, obtaining the data from the external server further comprises sending a proxy request to the external server to have data associated with the link delivered to the endpoint, bypassing the virtual desktop client.

15. An apparatus, comprising:
a processor;
a first interface configured to communicate with an endpoint;
a second interface configured to communicate with a virtual desktop client;
logic coupled to the first interface and the second interface, the logic is operable to receive data for the endpoint from the virtual desktop client via the second interface;
wherein the data comprises at least one link to data available from a plurality of external servers;
wherein the logic is operable to obtain the data associated with the at least one link from an external server selected from the plurality of external servers;
wherein the logic is operable to select the external server from the plurality thereof based on a distance between the external server selected and the endpoint and a download time for acquiring data from the external server;
wherein the logic is operable to process at least a portion of executable instructions within the data via the virtual desktop client to generate content defined by the executable instructions; and
wherein the logic is operable to send the data and processed instruction content from the virtual desktop client and data from the external server to the endpoint.

16. The apparatus of claim 15, wherein the data comprises data representative of a first data type and data representative of at least one other data type.

17. The apparatus of claim 16, wherein the first data type of is one of a group consisting of a video stream, an audio stream, an audiovisual stream, a data stream, an image, and any combination of an image, video stream, audio stream, and data stream.

18. The apparatus of claim 16, wherein processing of at least a portion of executable instructions within the data via the virtual desktop client to generate content defined by the executable instructions comprises processing the executable instructions of the data representative of the at least one other data type.

19. The apparatus of claim 15, wherein the logic is further operable to convert data received from the external server to a format compatible with the endpoint.

20. The apparatus of claim 15, wherein the logic is further operable to mix the data from the virtual desktop client with the data from the external server.

21. The apparatus of claim 15, wherein the logic is further operable to send a proxy request to the external server to have data associated with the link delivered to the endpoint, bypassing the virtual desktop client.

22. The apparatus of claim 15,
wherein the logic is further operable to determine an amount of time for acquiring data associated with the link from the external server; and
wherein responsive to determining that the time for acquiring the data associated with the link is greater than a predetermined amount of time, the logic is further operable to send a proxy request to the external server to have data associated with the link delivered to the endpoint, bypassing the virtual desktop client.

* * * * *

UNITED STATES PATENT AND TRADEMARK OFFICE
CERTIFICATE OF CORRECTION

PATENT NO. : 9,762,643 B2
APPLICATION NO. : 14/503778
DATED : September 12, 2017
INVENTOR(S) : Stephan Friedl et al.

It is certified that error appears in the above-identified patent and that said Letters Patent is hereby corrected as shown below:

In Column 1, Line 28, delete "component" and insert -- Component --, therefor.

In Column 4, Line 32, delete "(hyper text" and insert -- (hypertext --, therefor.

In Column 6, Line 20, delete "(packet" and insert -- (public --, therefor.

In Column 7, Line 35, delete "endusers" and insert -- end users --, therefor.

In Column 8, Line 22, delete "thee" and insert -- the --, therefor.

In Column 8, Line 26, delete "mayor" and insert -- may or --, therefor.

Signed and Sealed this
Twenty-first Day of November, 2017

Joseph Matal
*Performing the Functions and Duties of the
Under Secretary of Commerce for Intellectual Property and
Director of the United States Patent and Trademark Office*